United States Patent [19]
Moesta

[11] 3,712,582
[45] Jan. 23, 1973

[54] FLUID FLOW CONTROL VALVE AND LINEAR ACTUATOR THEREFOR

[76] Inventor: Donald L. Moesta, 38046 Jamison Drive, Livonia, Mich. 48154

[22] Filed: July 16, 1970

[21] Appl. No.: 55,431

[52] U.S. Cl. ............251/134, 251/209, 318/369, 318/468, 318/626
[51] Int. Cl. ..................F16k 31/04, H02p 3/04
[58] Field of Search......251/205, 209, 215, 324, 361, 251/131, 134; 318/369

[56] References Cited

UNITED STATES PATENTS

| | | | |
|---|---|---|---|
| 1,004,845 | 10/1911 | Bohme | 251/205 X |
| 2,427,439 | 9/1947 | Brown | 251/324 |
| 3,558,100 | 1/1971 | Hulsey | 251/209 X |
| 2,977,437 | 3/1961 | Doane | 251/134 X |
| 1,824,157 | 9/1931 | King | 251/324 |
| 1,850,850 | 3/1932 | Peterson | 251/205 |
| 3,488,030 | 1/1970 | Hulme et al. | 251/134 |

*Primary Examiner*—Arnold Rosenthal
*Attorney*—Hauke, Gifford and Patalidis

[57] ABSTRACT

A support housing having a cylindrical bore in which a complementary cylindrical spool valve is carried and screw-threadedly engaged with the housing, the valve being rotated by a drive motor for linear movement of the valve in the bore, an inlet port and an outlet port opening to the bore so that communication therebetween is accurately controlled by the linear positioning of the spool valve, a pulse drum structure connected with and rotating with the spool valve and having sensor points thereon which, as the pulse drum rotates with the valve, pass by a sensing device which is thus enabled to sense linear change of position of the drum and hence its associated valve, and a control system operatively connected with the sensing device and the drive motor for actuating the valve to accurately located positions providing selected flow rates through the valve.

10 Claims, 19 Drawing Figures

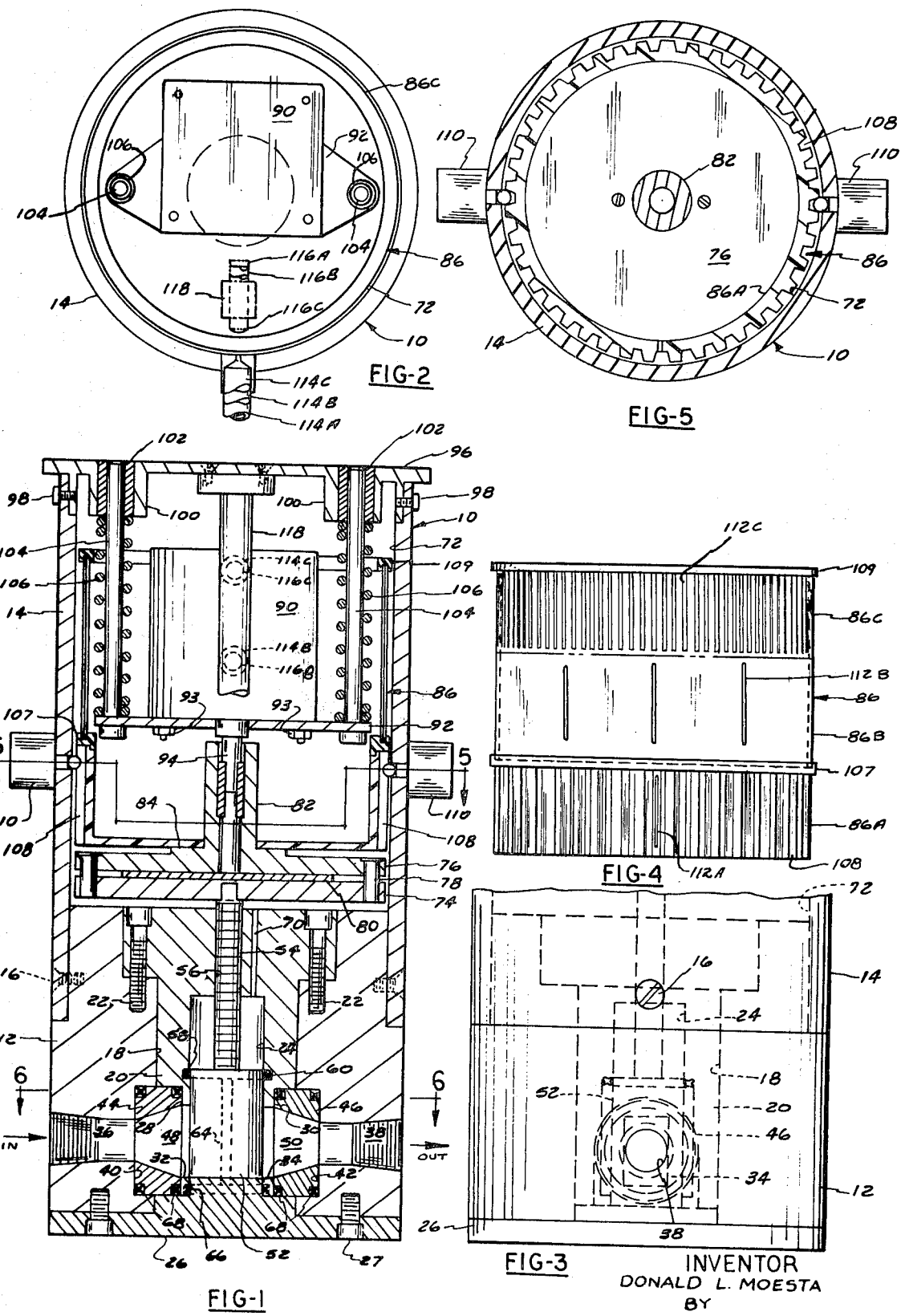

INVENTOR
DONALD L. MOESTA
BY
*Nauke Gifford & Patalidio*
Attorneys

PATENTED JAN 23 1973
3,712,582
SHEET 3 OF 3
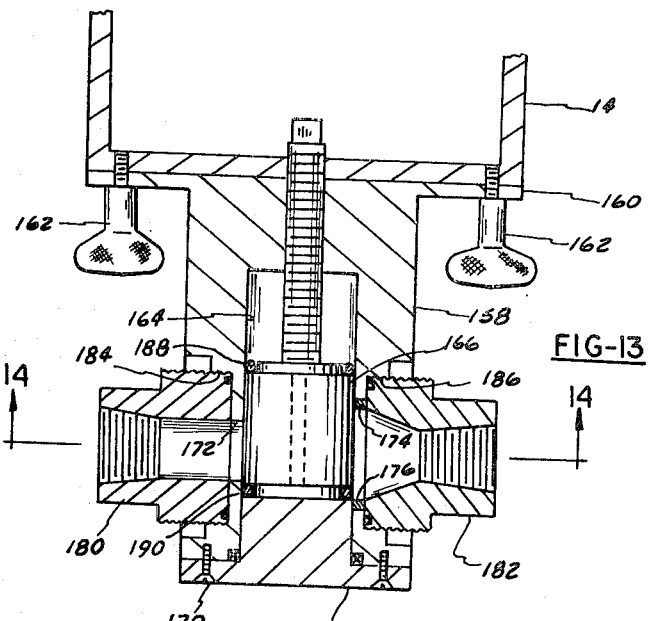
FIG-13
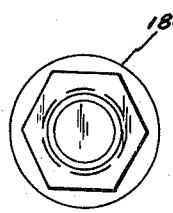
FIG-15
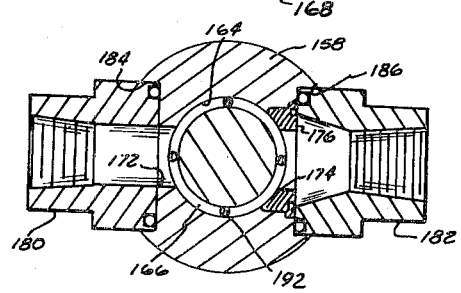
FIG-14
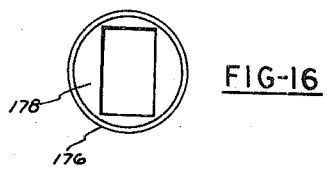
FIG-16
FIG-17
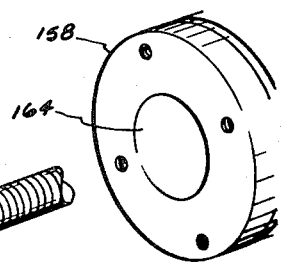
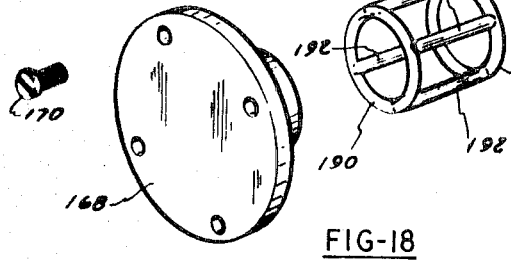
FIG-18
INVENTOR
DONALD L. MOESTA
BY
Hauke Gifford & Patalidis
Attorneys

FLUID FLOW CONTROL VALVE AND LINEAR ACTUATOR THEREFOR

BACKGROUND OF THE INVENTION

1. Field of the Invention

My invention relates to fluid flow valve structures and to linear actuators therefor.

2. Description of the Prior Art

Fluid flow control valves and actuators therefor that can be controlled directly by signals from computers and other sophisticated electronic control devices have been slow in entering the market. Some of the drawbacks to devices heretofore have been their lack of dimensional stability and hence accuracy in controlling fluid flow rates, lack of versatility in adapting the valves to varying requirements, and structural complexity resulting in their relatively high cost as well as maintenance and repair difficulties.

SUMMARY OF THE INVENTION

The present invention has for its main object the precision control of fluid flow in order to achieve dimensional stability when fluid power is used in manufacturing processes, to facilitate accurate fluid batching and dispensing control, for temperature and pressure control systems to eliminate various accessory hydraulic components which are in devices heretofore on the market, and to provide simplified means for detecting selective and custom flow ranges in the valve. Two aspects of the present invention are of primary importance; first, the construction of the fluid flow valve itself which is highly simplified to facilitate maintenance and replacement of components and affords an adaptability to a variety of requirements by merely changing a single orifice to any desired flow range, and, second, the construction of a unique linear actuator system which is readily tied into any type of manual, computer or other control device.

The flow control valve of the present invention basically comprises a housing having a cylindrical bore and a spool valve in the bore with a shaft screw-threaded into the housing and coupled to an actuator motor so that rotation of the spool valve by the motor produces controlled linear movement within the bore. An inlet port and an outlet port open through the housing to opposite sides of the bore, and the end of the bore is closed by an end cap secured to the housing. This construction permits removal of the spool valve from the bore by merely removing the end cap and unscrewing the spool valve from the housing. Inlet and outlet port fittings secured to the housing may be removed and replaced readily with any size fittings desired, and in some modifications the outlet port fitting is adapted to retain between its inner end and the outlet port an orifice plate which is readily removed and replaced by a plate having any desired shape or size of orifice upon merely removing the outlet port fitting.

The screw-threaded shaft of the spool valve is adapted to carry a pulse drum device which rotates within a cylindrical chamber in the housing and moves linearly with the spool valve. The pulse drum has on its peripheral surface predetermined sets of annularly spaced longitudinal sensor lines, and the housing carries a sensing means positioned relative to the sensor lines and operable to sense the passing thereby of the sensor lines as the spool valve member rotates relative to the housing. The sensing means transmits a signal to any desired control system provided, which is thus enabled to determine linear change of position of the spool valve and can be arranged to energize and de-energize the spool valve drive motor, accurately positioning the spool valve to vary the degree of opening and closing of the outlet port.

Conveniently, the drive motor is contained within the cylindrical pulse drum and moves linearly with it and the spool valve, being restrained from rotating by guide pins carried by the housing.

In one modification of the invention, the housing has a flow sleeve secured therein which contains the cylindrical bore in which the spool valve moves, the flow sleeve being removable from the housing so that it can be replaced by a flow sleeve having any desired size and shape of inlet and outlet ports.

The spool valve or the housing interior is provided with suitable fluid seals so that fluid flow is restricted to passage, between the inlet and outlet ports, to that space between the outer extremity of the spool valve and the bore closing end cap.

DESCRIPTION OF THE DRAWINGS

For a more complete understanding of the invention, reference may be had to the accompanying drawings illustrating preferred embodiments of the invention in which like reference characters refer to like parts throughout the several views and in which:

FIG. 1 is a longitudinal cross-sectional view of one preferred embodiment of the flow control valve, linear actuator and sensing device of the invention;

FIG. 2 is a top view of the structure of FIG. 1 with the upper cover plate removed for clarity;

FIG. 3 is a fragmentary side view of the lower valve portion of the structure of FIG. 1 as seen from the right side thereof;

FIG. 4 is a side elevational view of the pulse drum structure of FIG. 1 illustrating the sensor lines thereon;

FIG. 5 is a cross-sectional view taken substantially on the line 5—5 of FIG. 1;

FIG. 13 is a longitudinal cross-sectional view of another modification of the invention in which the flow control sleeve also serves as the main body of the valve housing;

FIG. 14 is a cross-sectional view taken substantially on line 14—14 of FIG. 13;

FIG. 15 is an elevational end view of the inlet port fitting of FIGS. 13 and 14 as seen from the left side thereof;

FIG. 16 is an elevational view of the outlet orifice plate used in the modification of FIGS. 13 and 14;

FIG. 17 is a side view of the outlet orifice plate of FIG. 16 as seen from the lower side thereof;

FIG. 18 is a fragmentary exploded perspective view of components of the fluid flow valve assembly of FIG. 13.

DESCRIPTION OF THE PREFERRED EMBODIMENTS

Referring first to the modification of FIGS. 1 through 8, a fluid flow control device 10 is illustrated as comprising a lower housing portion 12 and an upper cylindrical housing portion 14 secured together by any means such as screws 16.

Figure 7:
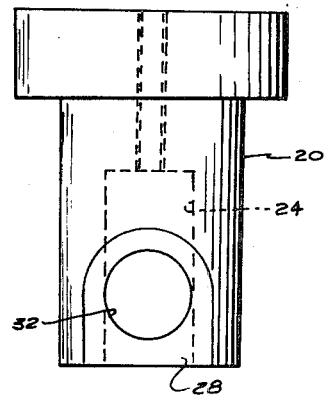
FIG. 7 is a side view of the flow control sleeve embodied in the structure of FIG. 1 as seen from the left side thereof.
Figure 8:
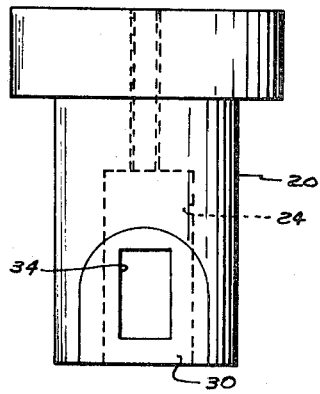
FIG. 8 is a side view of the flow control sleeve embodied in the structure of FIG. 1 as seen from the right side thereof.

The lower housing portion 12 has a preferably cylindrical stepped bore 18 extending longitudinally therethrough and within which a cylindrical stepped flow control sleeve 20 is removably secured by any means such as screws 22. The flow control sleeve 20 has an internal longitudinal valve bore 24 open at its lower or outer end, the lower or outer ends of the housing bore 18 and the flow control sleeve valve bore 24 being closed by a stepped end cap 26, as seen in FIG. 1, removably secured to the housing portion 12 by any means such as screws 27. Opposite lower side portions of the flow control sleeve 20 are milled out as at 28 and 30, as indicated in FIGS. 1, 7 and 8, with an inlet port 32 and an outlet port 34 cut through the thinner sections in the milled-out portions 28 and 30. The inlet and outlet ports 32 and 34 lead directly into the valve bore 24.

The lower housing portion 12 has inlet and outlet passages 36 and 38 adapted for connection to any suitable piping (not shown), and at the inner ends of the passages 36 and 38 the housing portion 12 is recessed as at 40 and 42 to retain inlet and outlet spacers 44 and 46 which extend into and fit within the milled out portions 28 and 30 respectively of the flow control sleeve.

The inlet and outlet spacers 44 and 46 are provided respectively with tapered through ports 48 and 50 which are sized at their inner and outer ends to register respectively with the inlet and outlet ports 32 and 34 of the flow control sleeve 20 and the inlet and outlet passages 36 and 38 of the lower housing portion 12. It will be noted that the through port 50 in the outer spacer 46 is rectangular at its inner end and circular at its outer end, and the port 50 is therefore formed or machined to provide a smooth merging of the cross-sectional areas between its inner and outer ends.

A cylindrical flow control valve 52 is closely fitted within and rotatably and axially movable within the valve bore 24 of the flow control sleeve 20 and has a threaded shaft 54 extending from its upper end through a threaded bore 56 in the body of the flow control sleeve 20, such that rotation of the shaft 54 effects a linear movement of the flow control valve 52 to variably control fluid flow from the inlet port 32 to the outlet port 34 between the lower end of the flow control valve 52 and the innermost closing portion of the end cap 26.

Figure 6:
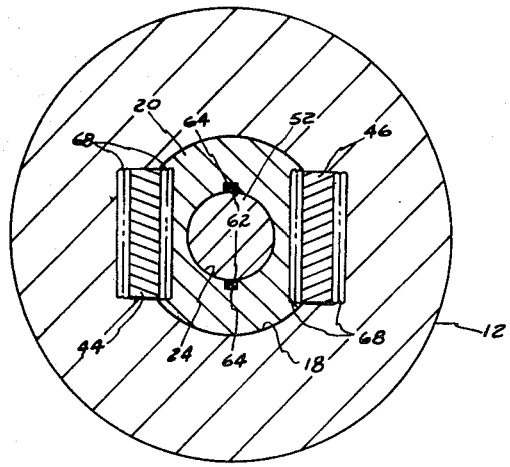
FIG. 6 is a cross-sectional view taken substantially on the line 6—6 of FIG. 1.

An annular recess 58 is provided in the valve bore 24 to retain an annular seal 60 disposed adjacent the upper end of the flow control valve 52 when same is in its lowermost or fully closed position, as shown in FIG. 1. A pair of longitudinal recesses 62 provided on the interior surface of the valve bore 24 extend from the annular recess 58 downwardly to the end cap 26 for retention of longitudinal seals 64, as shown in FIGS. 1 and 6. The seal 60 is arranged to prevent fluid leakage into the upper section of the valve bore 24, and the seals 64 are arranged to prevent leakage of fluid around the sides of the flow control valve 52 between the inlet port 32 and the outlet port 34, thus assuring flow of all fluid to that space beneath the body of the flow control valve 52. An annular seal 66 is provided around the upper step of the end cap 26 within the lower or outermost end of the valve bore 24 to prevent external leakage of fluid therefrom. Seals 60, 64 and 66 are all integrally formed as a harness seal. Additional seals 68 are provided around the inner and outer edges of the inlet and outlet spacers 44 and 46 to prevent leakage of fluid into any space which might exist between the flow control sleeve 20 and the lower housing portion 12 or between the end cap 26 and the lower housing portion 12. The annular seals 68 also are provided to accommodate any clearances which might exist between the spacers 44 and 46, the housing portion 12, and the flow control sleeve 20.

Since the valve bore 24 is thus effectively sealed, the inner portion above the valve 52 is preferably vented through the flow control sleeve 20 by any means such as a vent passage 70.

The valve actuating and position sensing components of the present invention are contained within a cylindrical chamber 72 provided in the upper housing portion 14, as shown in FIGS. 1 and 2. The upper or inner end of the threaded valve shaft 54 which protrudes into the chamber 72 is coupled to a driven plate 74 connected to a driving plate 76 by thrust pins 78, with a thrust bearing 80 disposed intermediate the plates 74 and 76 as shown. The driving plate 76 has a centrally bored hub portion 82 provided with an annular flange 84 to which is supportably secured a pulse drum structure 86.

A drive motor 90, secured to a longitudinally floating support plate 92 by any means such as studs and nuts 93, has its drive shaft 94 keyed into the central bore of the hub 82 as shown to rotatably drive the pulse drum structure 86 and the flow control valve 52, which are all secured together for rotation and linear movement relative to the supporting housing portions 12 and 14. An upper cover plate 96 is removably secured to the upper housing portion 14 by any means such as screws 98, and has a pair of downwardly extending bosses 100 provided with internal bushings 102 to slidably support a pair of guide rods 104 which extend inwardly into the housing chamber 72. The drive motor support plate 92 is secured on the guide rods 104 to keep the motor body from rotating when energized. The drive motor 90 with its support plate 92 is urged downwardly at all times by any means such as springs 106, which are carried on the guide rods 104. In operation, as will be described more fully, the guide rods 104 will rise through the upper cover 96, as the flow control valve 52 is retracted, an amount equal to the linear travel of the valve, providing a secondary means of indicating the degree to which the valve is opened, and for calibrating its position.

The pulse drum structure 86 comprises a lower section 86A, an intermediate section 86B and an upper section 86C. The lower section 86A is provided around its periphery with a plurality of longitudinally extending notches 108 into which are selectively engaged spherical core ends of braking and positioning solenoids 110. At least one longitudinal sensing line 112A is provided in one of the notches 108 as indicated in FIG. 4 of a length at least as long as or proportionate to the longitudinal travel of the valve 52 and its associated threaded shaft 54. The intermediate and upper pulse drum structure sections 86B and 86C are formed together as a plain cylindrical structure, set between a lower support ring 107 carried on the upper edge of the section 86A and an upper support ring 109 as shown. The portions 86B and 86C have sets of annularly spaced longitudinal sensor lines 112B and 112C respectively, being similar to the sensor line 112A in predetermined multiples thereof. For example, with a single sensor line 112A, there may be ten equally annularly spaced sensor lines 112B and 100 equally annularly spaced sensor lines 112C. If desired, instead of the lines 112A, 112B and 112C, vertically spaced sensor points may be provided, on helixes which correspond with the helical thread of the spool valve shaft 54.

Any desired sensing devices may be mounted on the upper housing portion 12 in proximity to the pulse drum sections 86A, 86B and 86C such that as the drive motor rotates the pulse drums, causing them to move linearly due to the threaded connection between the valve spool shaft 54 and the flow control sleeve 20, the sensing means will be able to transmit pulses as the sensor lines or points pass by, the pulses being thus very accurately related to the linear change of position of the spool valve 52.

The sensor lines or points in the embodiments of the invention shown in this application may comprise perforations through the pulse drum sections 86A, 86B and 86C. The sensing device in this case preferably consists of light sources 114A, 114B and 114C respectively positioned in proximity to the sensor points or lines 112A, 112B and 112C and mounted on the upper housing portion 14. Electric eyes or other light sensing elements 114A, 114B and 114C respectively align with the light sources 116A, 116B and 116C, and are mounted on a support post 118 secured to and depending from the upper cover plate 96 downwardly into the interior of the pulse drum structure 86, as indicated in FIGS. 1 and 2.

The pulse drum may be made of plastic or the like and the sensor points or lines may merely be transparent areas, or alternatively the drum may be transparent and the sensor points or lines may be opaque areas, which can be printed, silk-screened, or photographically imprinted.

It will be apparent that other types of sensor points or lines and other types of sensing means may be employed. For example, the sensor points or lines may be magnetic areas and the sensing devices may be magnetic pickup heads, or the sensor points or lines may be slight dimples or ridges protruding from the surface of the pulse drum structure 86 with the sensing devices being proximity elements or any similar devices which would distinguish the dimples or ridges from the remaining surface of the drum.

Figure 19:
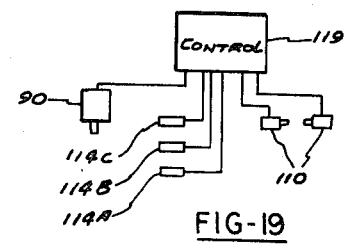
FIG. 19 is a simplified block diagram illustrating the control system of the invention integrated with the drive motor, sensing means and braking device thereof.
Figure 9:
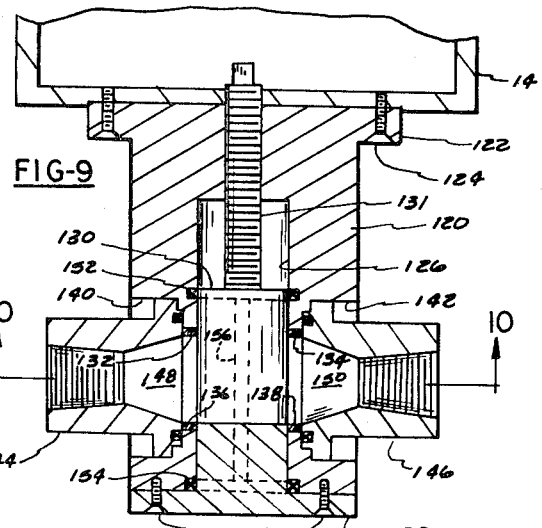
FIG. 9 is a longitudinal cross-sectional view of a modification of the invention in which the flow control sleeve serves as the main body of the valve housing.
Figure 11:
FIG. 11 is an elevational view of the inlet orifice plate or ring used in the modification of FIG. 9.
Figures 10, 12:
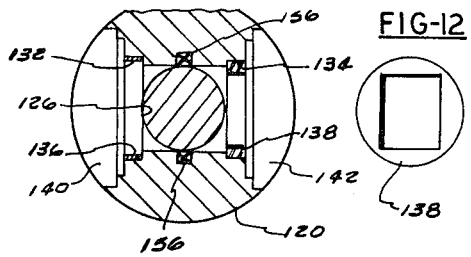
FIG. 10 is a cross-sectional view of the flow control sleeve or valve body of FIG. 9 taken substantially on the line 10—10 thereof and with the inlet and outlet port fittings removed.
FIG. 12 is an elevational view of the outlet orifice plate used in the modification of FIG. 9.

The drive motor 90, the braking and positioning solenoids 110 and the electric eyes 114A, 114B and 114C may all be connected into a control device 119, indicated in the block diagram of FIG. 19, and may, for example, operate in the following fashion.

Assuming a starting position for the flow control valve 52 as that shown in FIG. 1, i.e., fully closed with a constant predetermined fluid pressure at the inlet port 32, a command would be fed into the control device 119 that the valve be actuated to produce, for example, a given flow rate to fluid passing between the inlet port 32 and the outlet port 34. The control device 119 would then energize the drive motor 90 for operation in that direction which would begin retracting the flow control valve 52 into the valve bore 24. The electric eye 114A would operate to sense each full revolution of the pulse drum structure 86 (which is the same as each complete revolution of the flow control valve 52) representing a given increment of linear travel of the flow control valve 52. In the present case, it is contemplated that the screw threads of the valve shaft 54 may be 20 to the inch, so that 1 full revolution of the valve 52 would effect flow from the inlet port 32 through the outlet port 34 at 1/20 of full flow, assuming that the outlet port 34 is rectangular as shown in FIG. 8. The electric eye 114B would sense each 1/10 of a revolution or 1/200 of full flow, and the electric eye 114C would sense each 1/100 of a revolution, or 1/2000 of full flow. The control system can readily determine precisely when the desired fluid flow position of the valve 52 is attained, at which time the drive motor 90 will be deenergized and the solenoids 110 will be energized to engage with the appropriate notch 108 in the pulse drum structure lower section 86A. It is contemplated that there will be 100 notches around the periphery of the lower section 86A so that the positioning will be very precisely controlled.

It will be apparent that the flow rate through the present flow control valve for any given fluid is primarily a function of the position of the spool valve 52 and the size and shape of the outlet port 34 in the flow control sleeve 20. If at any time it becomes desirable to change the flow rate of the system due to use with different fluids or use for different systems in which the fluid is being used, the flow control sleeve may be replaced with a flow control sleeve having a differently sized or dimensioned outlet port. Removal of the flow control sleeve 20 may be accomplished simply by removing the upper cover plate 96, which lifts out the motor 90, removing or lifting out the pulse drum structure 86 with the attached plates 74 and 76, removing the screws 22 holding the flow control sleeve 20 in the lower housing portion 12, and then lifting out the flow control sleeve 20. Alternatively, the housing portions 12 and 14 may be separated by removing the screws 16, and the upper housing portion 14 lifted off, carrying with it the motor, drums, and connecting plates, after which the flow control sleeve may be removed as above described. This then frees the housing bore 18 for access to the inlet and outlet spacers 44 and 46 which can then be replaced with other spacers having passages therethrough appropriately registering with the inlet and outlet ports 32 and 34 of any other flow control sleeve 20.

The flow control valve 52 may be removed upon removing the lower end cap 26 and unscrewing the flow control valve 52 from the flow control sleeve 20.

If desired, pulse drum structures 86 having different numbers of and differently spaced sensor points or lines could be provided for use in the device without the necessity of changing the flow control sleeve 20, the number and spacing of the sensor points or lines being related properly to the specific gravity of the fluid for which the device is to be used, such that the control device 119 calibration itself would remain the same and would register and function relative to absolute flow rates of any fluid.

FIGS. 9 through 12 illustrate another modification of the invention in which the flow control sleeve is a valve body which actually constitutes the lower housing section of the device. In this modification, a preferably cylindrical valve body 120 is provided with an upper flange 122 for securing to the lower surface of the upper housing portion 14 by any means such as screws 124. A longitudinal cylindrical hollow bore 126 is provided in the valve body 120 as shown, with its lower end closed by an end cap 128 having a central portion extending upwardly into the bore 126 and secured to the valve body 120 by any means such as screws 129.

A cylindrical flow control valve 130, similar to the flow control valve 52 of FIG. 1, is disposed within the valve bore 126 and has a threaded shaft 131 screw-threaded through the upper end of the valve body 120 as shown, the upper end of the shaft 131 being adapted for connection to the pulse drum structure and drive motor as in the modification of FIGS. 1 through 8.

The valve body 120 has inlet and outlet port openings 132 and 134 respectively in which are located inlet and outlet orifice rings or plates 136 and 138 respectively sized to provide the desired fluid flow rate.

The outer sides of the valve body 120 are recessed as at 140 and 142 with threaded surfaces to receive threaded inlet and outlet fittings 144 and 146, the fittings being adapted for connection to suitable piping or the like and having inner passage openings 148 and 150 formed to register with the orifices of the respective inlet and outlet orifice plates 136 and 138.

A harness type seal, having upper and lower annular portions 152 and 154 connected by a pair of longitudinal side portions 156, is positioned in appropriate recesses provided on the inner surface of the valve bore 126 for sealing the device against fluid leakage as heretofore explained in relation to the modification of FIGS. 1 through 8.

In this modification, the valve body 120 and its accompanying parts may readily be removed from the upper housing portion 14 and replaced with a valve body having differently sized or dimensioned bore and ports. Also, the flow control valve 130 may easily be removed and replaced merely by removing the lower end cap 128 and unscrewing the valve 130 from the valve body 120. The orifice plates 136 and 138 may readily be changed merely by removing the respective inlet and outlet fittings 144 and 146.

Finally, a further modification of the invention is shown in FIGS. 13 through 18 in which a valve body 158, similar to the valve body 120 of FIGS. 9–12 has an upper flange 160 secured to the upper housing 14 by thumb screws 162 or the like. A valve bore 164 is provided in the valve body 158 for a flow control valve 166. The lower end of the valve bore 164 is closed by an end cap 168 secured to the valve body 158 by any means such as screws 170.

In this modification, the valve body 158 is provided with a standard size inlet port 172 and an outlet port 174 in which is carried an outlet orifice plate 176 which has its inner surface 178 arcuately shaped complementary to the cylindrical surface of the flow control valve 166. Inlet and outlet fittings 180 and 182 are adapted to be screw-threaded into recesses 184 and 186 provided in the valve body 158, the outlet fitting 182 serving to retain the outlet orifice plate 176 in place.

A harness seal having upper and lower annular portions 188 and 190 connected by four longitudinal side seal portions 192 is provided in appropriate recesses on the outer surface of the flow control valve 166 as shown in FIG. 18 for sealing, as the flow control valve 166 rotates and moves axially within the valve bore 164.

Although I have described only a few embodiments of my invention, it will be apparent to one skilled in the art to which the invention pertains that various changes and modifications may be made therein without departing from the spirit of the invention or the scope of the appended claims.

I claim:

1. A flow control valve structure comprising:
   a. a support housing having a longitudinal cylindrical bore therein, said bore having a closed end, and an inlet and an outlet port axially aligned and opening through said housing to opposite sides of said cylindrical bore, a portion of said inlet and outlet ports opening to said bore at said closed end;
   b. a cylindrical rotatable spool valve member closely fitting said cylindrical bore and having a portion screw-threadedly engaged with said support housing for linear adjustment of said spool valve member within said bore on rotation thereof, said spool valve member having an outer end surface engagable with said closed end to prevent communication between said ports with fluid flow through said bore between the inlet and outlet ports being restricted to passage between the outer end surface of the spool valve member and the closed end of said bore when said spool valve member is disengaged from said closed end, said fluid flow through said bore being initiated immediately upon said disengagement;
   c. drive means selectively rotating said spool valve member to variably locate same at selected linear positions relative to said outlet port for controlling the degree of communication thereof through said bore with said inlet port, and
   d. an outlet port fitting removably secured to said housing adjacent said outlet port, and an orifice element retained in said outlet port by said outlet port fitting and removable when said outlet port fitting is removed from said housing.

2. A flow control valve structure comprising:

a. a support housing having a longitudinal cylindrical bore therein, said bore having a closed end, and an inlet and an outlet port axially aligned and opening through said housing to opposite sides of said cylindrical bore, a portion of said inlet and outlet ports opening to said bore at said closed end;

b. a cylindrical rotatable spool valve member closely fitting said cylindrical bore and having a portion screw-threadedly engaged with said support housing for linear adjustment of said spool valve member within said bore on rotation thereof, said spool valve member having an outer end surface engagable with said closed end to prevent communication between said ports with fluid flow through said bore between the inlet and outlet ports being restricted to passage between the outer end surface of the spool valve member and the closed end of said bore when said spool valve member is disengaged from said closed end, said fluid flow through said bore being initiated immediately upon said disengagement;

c. drive means selectively rotating said spool valve member to variably locate same at selected linear positions relative to said outlet port for controlling the degree of communication thereof through said bore with said inlet port, and d. means sensing rotation of said spool valve member with respect to a selected position and operably connected with said drive means to control the operation thereof, said means sensing rotation comprising a cylindrical member connected with and rotating proportionately with said spool valve member and having on its peripheral surface at least one longitudinal sensor line having a length which is proportionate to the effective longitudinal travel of said spool valve member portion; and a housing carried sensing device positioned relative to and operable to sense the movement of said sensor line as the spool valve member rotates relative to the support housing.

3. The structure as in claim 2 and in which said support housing has a cylindrical chamber and said cylindrical member comprises a hollow drum rotatable and axially movable in said chamber, said sensor line comprises a perforation in the drum, and said sensing device comprises a light source and a light sensor, one positioned within and one without said drum and aligned to sense the passage of said perforation between them.

4. The device as in claim 2 and in which said cylindrical member comprises an opaque hollow drum, said sensor line comprises a transparency in the drum, and said sensing means comprises a light source and a light sensor, one positioned within and one without said drum and aligned to sense the passage of said transparency between them.

5. The device as in claim 2 and in which said cylindrical member comprises a transparent hollow drum, said sensor line comprises an opacity in the drum, and said sensing means comprises a light source and a light sensor, one positioned within and one without said drum and aligned to sense the passage of said opacity between them.

6. The device as in claim 2 and in which said sensor line comprises a discontinuity in the nature of said cylindrical member, and said sensing means is positioned adjacent said cylindrical member and comprises means sensing the passage of said discontinuity.

7. The structure as in claim 5 and in which said cylindrical member has longitudinally spaced sensor line carrying portions, sets of sensor lines on one portion being of a selected multiple of the set or sets of sensor lines on the other portion, and said sensing device comprises elements positioned relative to and operable to sense the movement of the sensor lines of each portion.

8. The structure as in claim 5 in which said drive means comprises a drive motor disposed within said cylindrical member with a drive shaft coupled to the spool valve member, said drive motor and said cylindrical member arranged to be supported by and move linearly with said spool valve member, and said housing and drive motor having means coacting to prevent rotation of said drive motor.

9. The structure as in claim 5 and including control means operatively connected with said drive means and said sensing device for energizing said drive means to rotate said spool valve member for selected degrees of rotation.

10. The structure as in claim 9 and including brake means coacting between said support housing and said spool valve means and energized from said control means to stop said spool valve member at accurately located positions.

* * * * *